(12) United States Patent
Abuelsaad et al.

(10) Patent No.: US 10,101,171 B2
(45) Date of Patent: Oct. 16, 2018

(54) GENERATING AN OPTIMAL REFUELING PLAN FOR ROAD VEHICLES

(71) Applicant: International Business Machines Corporation, Armonk, NY (US)

(72) Inventors: Kelly Abuelsaad, Somers, NY (US); Gregory J. Boss, Saginaw, MI (US); Kevin C. McConnell, Austin, TX (US); Shane B. McElligott, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 14/498,327

(22) Filed: Sep. 26, 2014

(65) Prior Publication Data

US 2016/0091338 A1  Mar. 31, 2016

(51) Int. Cl.
*G01C 21/36* (2006.01)
*G01C 21/34* (2006.01)

(52) U.S. Cl.
CPC ..... *G01C 21/3697* (2013.01); *G01C 21/3469* (2013.01); *G01C 21/3679* (2013.01)

(58) Field of Classification Search
CPC ............ G01C 21/3697; G01C 21/3469; G01C 21/3679
USPC .... 701/408–411, 438, 468, 123, 532, 25–26, 701/533; 340/995.19; 705/14.49, 14
See application file for complete search history.

(56) References Cited

U.S. PATENT DOCUMENTS 5,542,394 A    8/1996  Tomisawa
6,142,421 A   11/2000  Palmer
6,356,836 B1 *  3/2002  Adolph .......................... 701/410
8,249,907 B2    8/2012  Blagg et al.
8,972,166 B2 *  3/2015  Donovan et al. ............. 701/408
9,002,632 B1 *  4/2015  Emigh .......................... 701/411
2007/0090937 A1 * 4/2007  Stabler ...................... 340/450.2

(Continued)

FOREIGN PATENT DOCUMENTS

CN        1952603 B   *  8/2010
GB      2009099797     *  1/2009

OTHER PUBLICATIONS

Potential Impacts of Plug-in Hybrid Electric Vehicles on Locational Marginal Prices; Lizhi Wang; Energy 2030 Conference, 2008. Energy 2008. IEEE; Year: 2008; pp. 1-7, DOI: 10.1109/ENERGY. 2008.4780997.*

(Continued)

*Primary Examiner* — Cuong H Nguyen
(74) *Attorney, Agent, or Firm* — Brown and Michaels, PC; James Nock (57) ABSTRACT

Generating a refueling plan for a vehicle on a route including the steps of monitoring fuel consumption of the vehicle and an amount of fuel remaining within the vehicle. When a fuel level within the vehicle falls below a threshold, determining a number of miles remaining on the route and fuel mileage of the vehicle and generating a list of fuel stations which are within driving range of the vehicle based on the vehicle's fuel mileage. The list may also include fuel stations which are outside the driving range of the vehicle which have a service for delivery of fuel to a point within the driving range of the vehicle and at least a price of the fuel and brand of the fuel at each of the fuel stations. The list of fuel stations is provided to a user of the vehicle for selecting a fuel station for refueling.

20 Claims, 6 Drawing Sheets

(56) References Cited

U.S. PATENT DOCUMENTS

| | | | |
|---|---|---|---|
| 2011/0307166 A1* | 12/2011 | Hiestermann et al. | 701/119 |
| 2013/0338855 A1* | 12/2013 | Mason | G07C 5/0816 701/2 |
| 2014/0277902 A1* | 9/2014 | Koch | G07C 5/008 701/29.1 |
| 2014/0278099 A1* | 9/2014 | Schenken | G06Q 10/02 701/533 |
| 2015/0153195 A1* | 6/2015 | Burlingham et al. | 701/1 |
| 2015/0154638 A1* | 6/2015 | Burlingham et al. | 701/1 |
| 2015/0224268 A1* | 8/2015 | Henry | A24F 47/008 128/202.21 |
| 2015/0227890 A1* | 8/2015 | Bednarek | G06Q 10/08355 705/26.81 |
| 2015/0228004 A1* | 8/2015 | Bednarek | G06Q 30/0633 705/26.8 |

OTHER PUBLICATIONS

Optimal Location of Compressed Natural Gas (CNG) Refueling Station Using the Arc Demand Coverage Model; Boostani, A.; Ghodsi, R.; Miab, A.K.; Mathematical/Analytical Modelling and Computer Simulation (AMS), 2010 Fourth Asia International Conference on; Year: 2010; pp. 193-198, DOI: 10.1109/AMS.2010.49.*

Multi-objective vehicle refueling planning using mixed integer programming; Shieu-Hong Lin; Industrial Engineering and Engineering Management (IEEM), 2014 IEEE International Conference on; Year: 2014; pp. 677-681, DOI: 10.1109/IEEM.2014.7058724.*

Location and selective routing problem with pricing for the collection of used products; Aras, N.; Aksen, D.; Tekin, T.; Computers and Industrial Engineering (CIE), 2010 40th International Conference on; Year: 2010; pp. 1-6, DOI: 10.1109/ICCIE.2010.5668217.*

On cooperation between a fuel constrained UAV and a refueling UGV for large scale mapping applications; Parikshit Maini; P. B. Sujit; 2015 International Conference on Unmanned Aircraft Systems (ICUAS); Year: 2015; pp. 1370-1377.*

Planning hydrogen refueling stations with coordinated on-site electrolytic production; Hongcai Zhang; Wei Qi; Zechun Hu; Yonghua Song; 2017 IEEE Power & Energy Society General Meeting; year 2017; pp. 1-5.*

Charging facility planning for Electric Vehicles; Siting Chang; Hongyang Li; Klara Nahrstedt; 2014 IEEE International Electric Vehicle Conference (IEVC); Year: 2014; pp. 1-7.*

Route planning algorithms for unmanned aerial vehicles with refueling constraints; Kaarthik Sundar; Sivakumar Rathinam 2012 American Control Conference (ACC); Year 2012, pp. 3266-3271.*

"A Drone-Delivery Expert Answers the Big Questions About Amazon's Plans", http://www.theatlantic.com/technology/archive/2013/12/a-drone-delivery-expert-answers-the-big-questons-about-amazons-plans/281980/; Dec. 2013.

"Amazon Prime Air", http://www.amazon.com/b?node=8037720011; at least as early as Dec. 2013.

"Battery Prototype Recharges Smartphones in 30 Seconds", http://mashable.com/2014/04/08/30-second-battery-charger/; Apr. 2014.

"Peptide Power: The Science Behind the 30-second Phone Charger", http://www.livescience.com/44893-peptide-power-the-science-behind-the-30-second-phone-charger.html; Apr. 2014.

Ron Rapp; "The Ultimate Endurance Record", http://www.rapp.org/archives/2013/11/the-ultimate-endurance-record/; Nov. 2013.

"City of Yuma Flight", http://www.azpbs.org/arizonastories/ppedetail.php?id=81, at least as early as Aug. 2014.

Tim Nudd, "The Spot: Refueling BMW 5 Series shows off its fuel economy with help from a Boeing KC-135 Stratotanker", May 2011.

Jarred Walton "Thoughts on Amazon Prime Delivery Drones" http://www.anandtech.com/show/7560/thoughts-on-amazon-prime-delivery-drones, Dec. 2013.

"Energy Density" http://en.wikipedia.org/wiki/Energy_density, at least as early as Sep. 2014.

Simon Mui, "Oil industry claims to make only one-third of actual profits" http://switchboard.nrdc.org/blogs/smui/oil_industry_claims_to_make_on_html, Apr. 2012.

* cited by examiner

GENERATING AN OPTIMAL REFUELING PLAN FOR ROAD VEHICLES

BACKGROUND

The present invention relates to generating an optimal refueling plan, and more specifically to generating an optimal refueling plan within user specified preferences.

A road vehicle's fuel consumption varies between users and vehicles depending on the type of roads, traffic and other factors. Managing fuel consumption of the vehicle can become complex for a user based on the user's preferences.

SUMMARY

According to one embodiment of the present invention, a method of generating a refueling plan for a road vehicle on a route. The method comprising the steps of: a computer monitoring fuel consumption of the road vehicle and an amount of fuel remaining within the road vehicle; wherein when a fuel level within the road vehicle falls below a threshold, the computer determining a number of miles remaining on the route and fuel mileage of the road vehicle; the computer generating a list of fuel stations which are within driving range of the road vehicle based on the fuel mileage of the road vehicle, the list also comprising fuel stations which are outside the driving range of the road vehicle which have a service for delivery of fuel to a point within the driving range of the road vehicle, the list including at least a price of the fuel and brand of the fuel at each of the fuel stations; the computer providing the list of fuel stations to a user of the road vehicle; and the computer receiving input from the user selecting a fuel station for refueling.

According to another embodiment of the present invention, a computer program product for generating a refueling plan for a road vehicle on a route comprising a computer comprising at least one processor, one or more memories, one or more computer readable storage media, the computer program product comprising a computer readable storage medium having program instructions embodied therewith. The program instructions executable by the computer to perform a method comprising: monitoring, by the computer, fuel consumption of the road vehicle and an amount of fuel remaining within the road vehicle; wherein when a fuel level within the road vehicle falls below a threshold, the computer determining a number of miles remaining on the route and fuel mileage of the road vehicle; generating, by the computer, a list of fuel stations which are within driving range of the road vehicle based on the fuel mileage of the road vehicle, the list also comprising fuel stations which are outside the driving range of the road vehicle which have a service for delivery of fuel to a point within the driving range of the road vehicle, the list including at least a price of the fuel and brand of the fuel at each of the fuel stations; providing, by the computer, the list of fuel stations to a user of the road vehicle; and receiving, by the computer, input from the user selecting a fuel station for refueling.

According to another embodiment of the present invention, a computer system for generating a refueling plan for a road vehicle on a route comprising a computer comprising at least one processor, one or more memories, one or more computer readable storage media having program instructions executable by the computer to perform the program instructions. The program instructions comprising: monitoring, by the computer, fuel consumption of the road vehicle and an amount of fuel remaining within the road vehicle; wherein when a fuel level within the road vehicle falls below a threshold, the computer determining a number of miles remaining on the route and fuel mileage of the road vehicle; generating, by the computer, a list of fuel stations which are within driving range of the road vehicle based on the fuel mileage of the road vehicle, the list also comprising fuel stations which are outside the driving range of the road vehicle which have a service for delivery of fuel to a point within the driving range of the road vehicle, the list including at least a price of the fuel and brand of the fuel at each of the fuel stations; providing, by the computer, the list of fuel stations to a user of the road vehicle; and receiving, by the computer, input from the user selecting a fuel station for refueling.

DETAILED DESCRIPTION

In an illustrative embodiment, it is recognized that the term "fuel" within the specification is used to refer to not only gasoline, but battery power, current, or any other means for providing energy to a vehicle.

In another illustrative embodiment, it is recognized that the system of the present invention analyzes the least cost option for obtaining fuel for a vehicle from a preferred or ideal fuel station. The ideal refueling station is determined based on user preferences, even when that station is outside the range of the vehicle's current fuel reserves. When the ideal refueling station is outside the range, an unmanned aerial vehicle (UAV) may be deployed to supply additional fuel in order to bring the target primary refueling station into effective range of the vehicle.

In another illustrative embodiment, it is recognized that vehicles may be equipped with a fuel intake system that allows delivery of fuel from a UAV.

Figure 1:
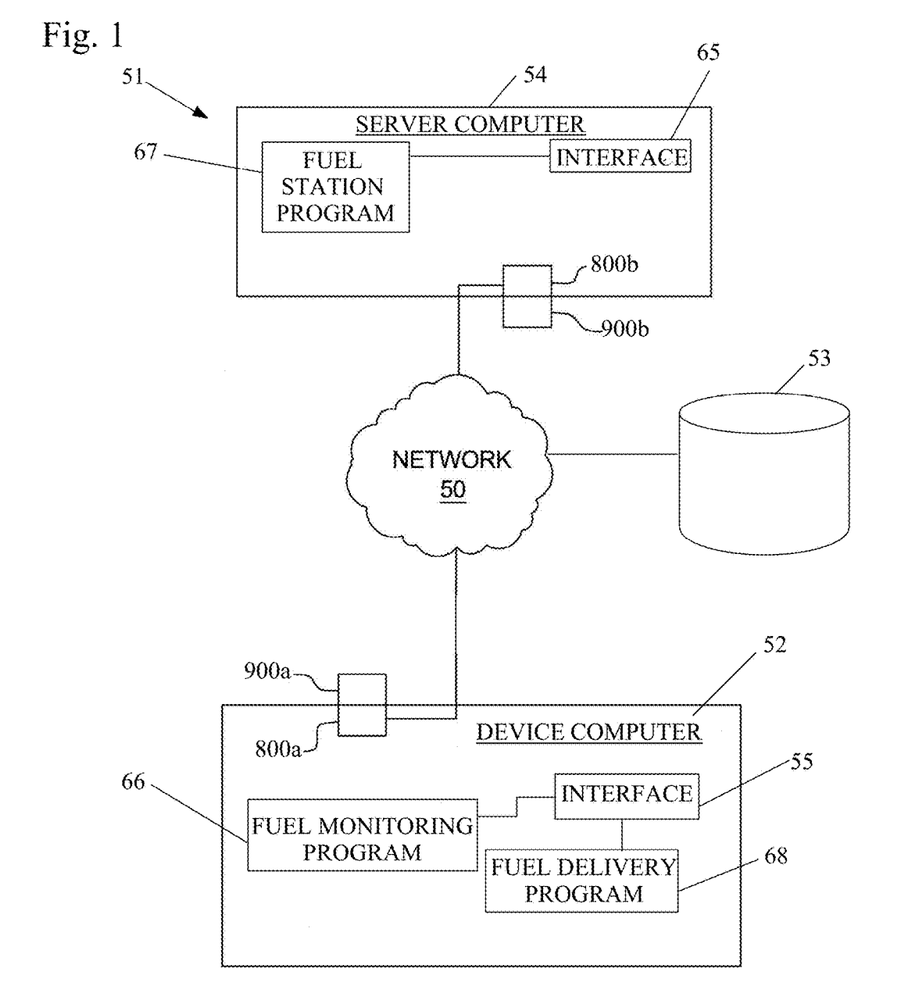
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

Device computer 52 may be, for example, a mobile device, a cell phone, a personal digital assistant, a netbook, a laptop computer, a tablet computer, a desktop computer, personal imaging device, a global positioning system (GPS) device, vehicular computer or any other type of computing device.

Device computer 52 may contain an interface 55. The interface 55 may accept commands and data entry from a user, such as user preferences and selections of fuel stations. The interface 55 can be, for example, a command line interface, a graphical user interface (GUI), or a web user interface (WUI) or alternatively on server computer 54. The device computer 52 preferably includes fuel monitoring program 66 and a fuel delivery program 68. While not shown, it may be desirable to have the fuel monitoring program 66 and a fuel delivery program 68 be present on the server computer 54. Device computer 52 includes a set of internal components 800a and a set of external components 900a, further illustrated in FIG. 5.

Figure 5:
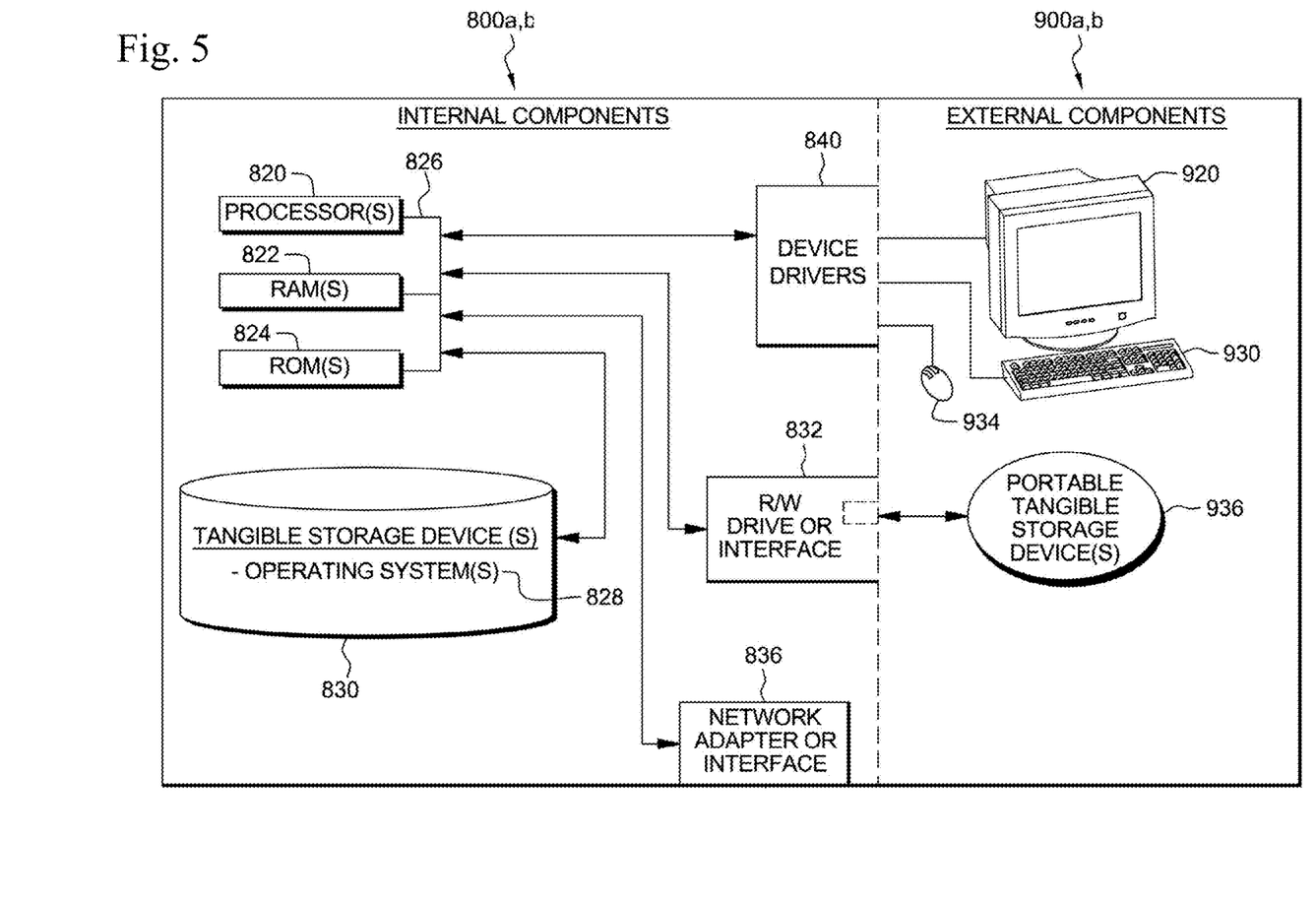
FIG. 5 illustrates internal and external components of a client or device computer and a server computer in which illustrative embodiments may be implemented.

Server computer 54 includes a set of internal components 800b and a set of external components 900b illustrated in FIG. 5. The server computer 54 may contain an interface 65. The interface 65 may accept commands, data entry, and input from fuel stations including pricing and promotions. The interface 65 can be, for example, a command line interface, a graphical user interface (GUI), or a web user interface (WUI). The server computer 54 also preferably includes a fuel station program 67.

In the depicted example, server computer 54 provides information, such as boot files, operating system images, and applications to device computer 52. Server computer 54 can compute the information locally or extract the information from other computers on network 50.

Program code and programs such as a fuel monitoring program 66, a fuel delivery program 68 and a fuel station program 67 may be stored on at least one of one or more computer-readable tangible storage devices 830 shown in FIG. 5, on at least one of one or more portable computer-readable tangible storage devices 936 as shown in FIG. 5, on repository 53 connected to network 50, or downloaded to a data processing system or other device for use. For example, program code and programs such as a fuel monitoring program 66, a fuel delivery program 68 and a fuel station program 67 may be stored on at least one of one or more tangible storage devices 830 on server computer 54 and downloaded to the device computer 52. Alternatively, server computer 54 can be a web server, and the program code and programs such as a fuel monitoring program 66, a fuel delivery program 68 and a fuel station program 67 may be stored on at least one of the one or more tangible storage devices 830 on server computer 54 and accessed on the device computer 52. Fuel monitoring program 66, fuel delivery program 68 and fuel station program 67 can be accessed on device computer 52 through interface 55. In other exemplary embodiments, the program code and programs such as a fuel monitoring program 66, a fuel delivery program 68 and a fuel station program 67 may be stored on at least one of one or more computer-readable tangible storage devices 830 on server computer 54 or distributed between two or more servers.

Figure 2A:
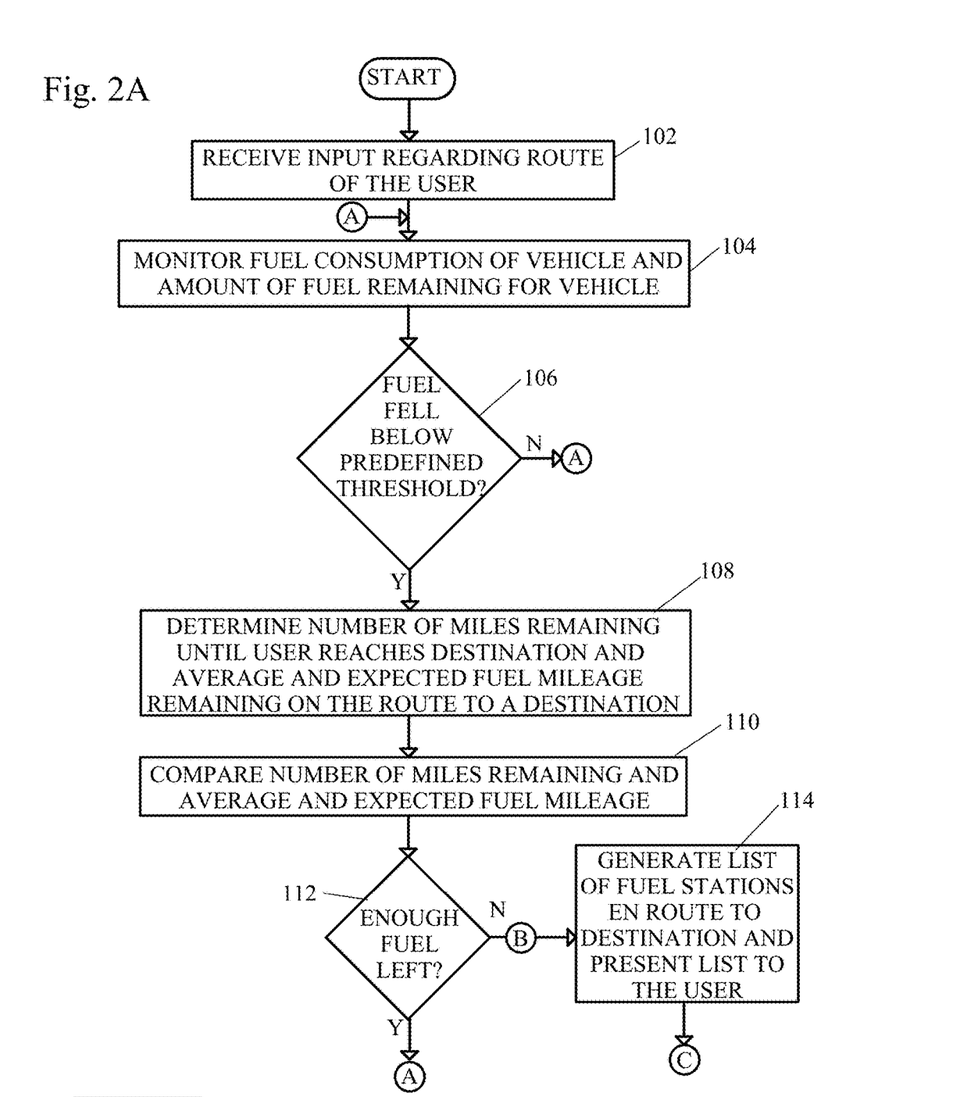
FIGS. 2A-2B shows a flow diagram of a method of generating an optimal refueling plan.
Figure 2B:
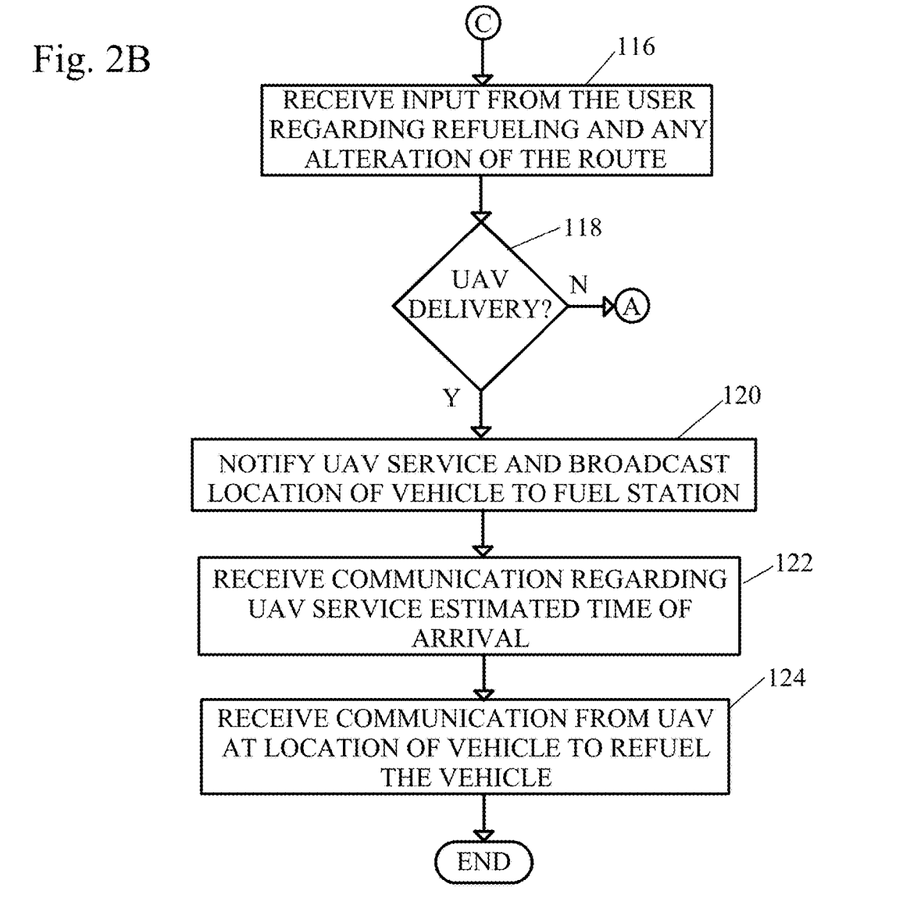

FIGS. 2A-2B shows a flow diagram of a method of generating an optimal refueling plan.

In a first step, the vehicular computer receives an input regarding a route to a destination of a user within a road vehicle (step 102), for example via the fuel monitoring program 66.

The vehicular computer monitors the fuel consumption of the road vehicle and amount of fuel remaining within the road vehicle remaining on the route to the destination (step 104), for example by a fuel monitoring program provided feedback from sensors within the road vehicle through the vehicular computer.

If the fuel does not fall below a threshold (step 106), the method returns to step 104 of monitoring fuel consumption.

If the fuel falls below a threshold (step 106), the number of miles remaining on the route until the user reaches the destination, and the average and expected fuel mileage of the road vehicle are determined (step 108), for example by the fuel monitoring program 66, accounting for speed, road conditions, and other feedback from sensors within the road vehicle communicated to the vehicular computer.

The fuel threshold may be a threshold that is predefined by the vehicle maker or may be set by the user. For example, the vehicle maker may recommend that the fuel within the road vehicle not be below one quarter of the total fuel of the road vehicle. A user, for example, wish to refuel the road vehicle when the fuel is at one half of the total fuel of the vehicle. Alternatively, the user may specify that once the fuel falls below the threshold, a list of fuel stations is generated regardless of whether there is enough fuel left.

If there is enough fuel left without reducing the road fuel of the vehicle to zero (step 112), then the method returns to step 104 of monitoring fuel consumption.

If there is not enough fuel left without reducing the fuel of the road vehicle to zero (step 112), a list of fuel stations en route to the destination is generated and presented to the user (step 114), for example by the fuel delivery program 68 through an interface 55. The list of fuel stations generated includes fuel stations that are within driving range of the road vehicle based on the fuel mileage of the road vehicle and fuel stations which are outside the driving range of the road vehicle which have a service for delivery of fuel to a point within the driving range of the road vehicle. The list preferably includes at least a price of the fuel and the brand of fuel at each of the fuel stations. The presentation of the fuel stations may be present on a simulated map of the current area of the road vehicle.

Once input from the user is received regarding refueling, the route is altered as necessary (step 116), for example by the fuel delivery program 68. If the fuel delivery is not going to take place with a UAV (step 118), the method returns to step 104 of monitoring fuel consumption.

If the fuel delivery is going to take place with a UAV delivery (step 118), the fuel station with the UAV service is notified with at least a current location of the road vehicle (step 120) through the vehicular computer through the fuel delivery program 68. An estimated time regarding UAV service arrival time is received (step 122), for example by the fuel delivery program 68 of the vehicular computer. A communication is received by the road vehicle regarding instructions for receiving the refueling from the UAV when the UAV has arrived at the vehicle's location (step 124) and the method ends.

Figure 3:
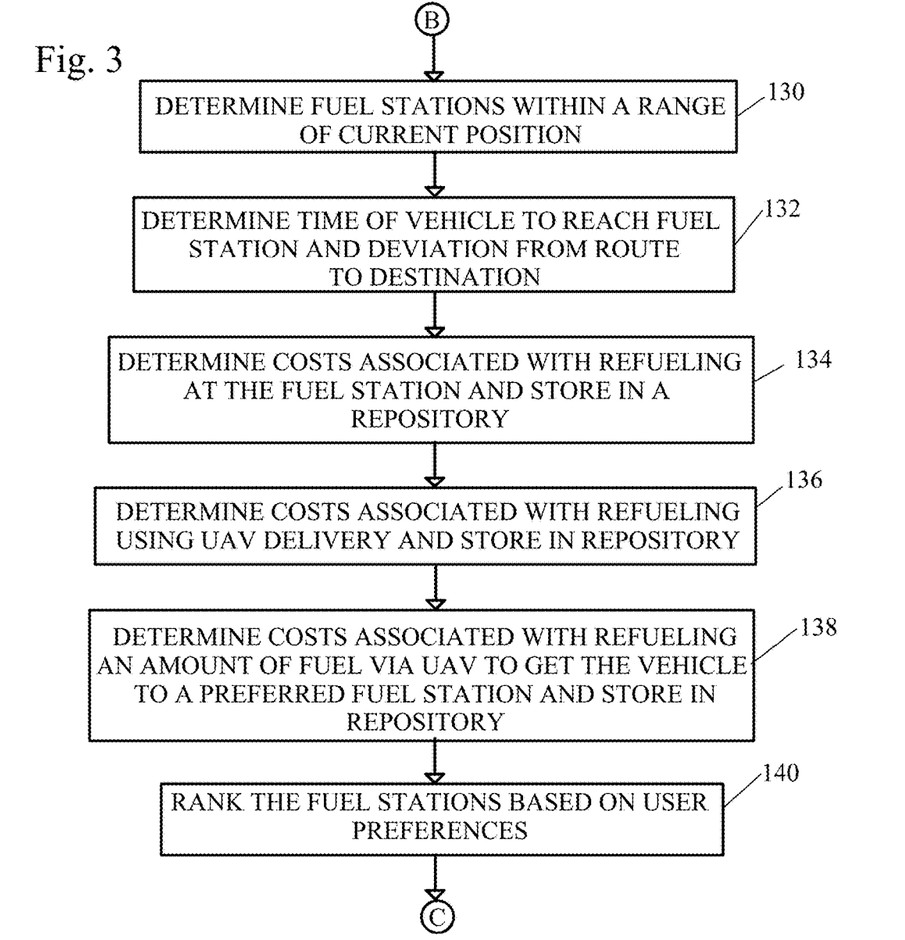
FIG. 3 shows a flow diagram of a method of generating a list of fuel stations en route to a destination.

FIG. 3 shows a flow diagram of a method of generating a list of fuel stations en route to a destination of step 114. The fuel delivery program 68 may access a repository 53 of fuel station information through the fuel station program 67 of the server computer 54 to determine the fuel stations within a range of the road vehicle's current position (step 130). The range may be predefined and may include fuel stations within the road vehicles distance to reach only using the fuel in the tank or fuel stations obtainable through additional fuel provided by UAV delivery or some other delivery service.

For each of the fuel stations available within a number of miles from the user's current destination, the fuel delivery program 68 preferably retrieves a price, availability of the preferred fuel, user brand preferences, distance from the current point, distance or deviation from the current route to the destination, and enablement of UAV delivery from a repository through the fuel station program 67. The number of miles is determined based on the average and expected fuel mileage as well as the fuel remaining.

The time for the road vehicle to reach the fuel stations within a range of the current position and the deviation from the route to the destination are determined (step 132), for example by the fuel delivery program 68.

The costs associated with the different fueling options are then determined. The costs associated with refueling at each of the fuel station are determined and stored in a repository (step 134). The costs associated with refueling using UAV delivery are determined and stored in a repository (step 136). The costs associated with refueling an amount of fuel via UAV to get the road vehicle to a preferred fuel station is determined and stored in a repository (step 138). It should be noted that when the costs are determined for UAV delivery to the road vehicle, the fuel capacity and fuel burn rate of the UAV, the speed of the UAV, the costs associated with operating the UAV, and the weather conditions need to be factored into the cost.

The fuel stations and associated cost options are ranked based on user preferences (step 140). The fuel stations and associated cost options may be sorted by difference user preferences based on additional user input through interface 55. The user preferences are preferably provided prior to or at the time of entering the destination for the road vehicle. The method then returns to step 116 of receiving input from the user regarding refueling and alteration of the route.

Figure 4:
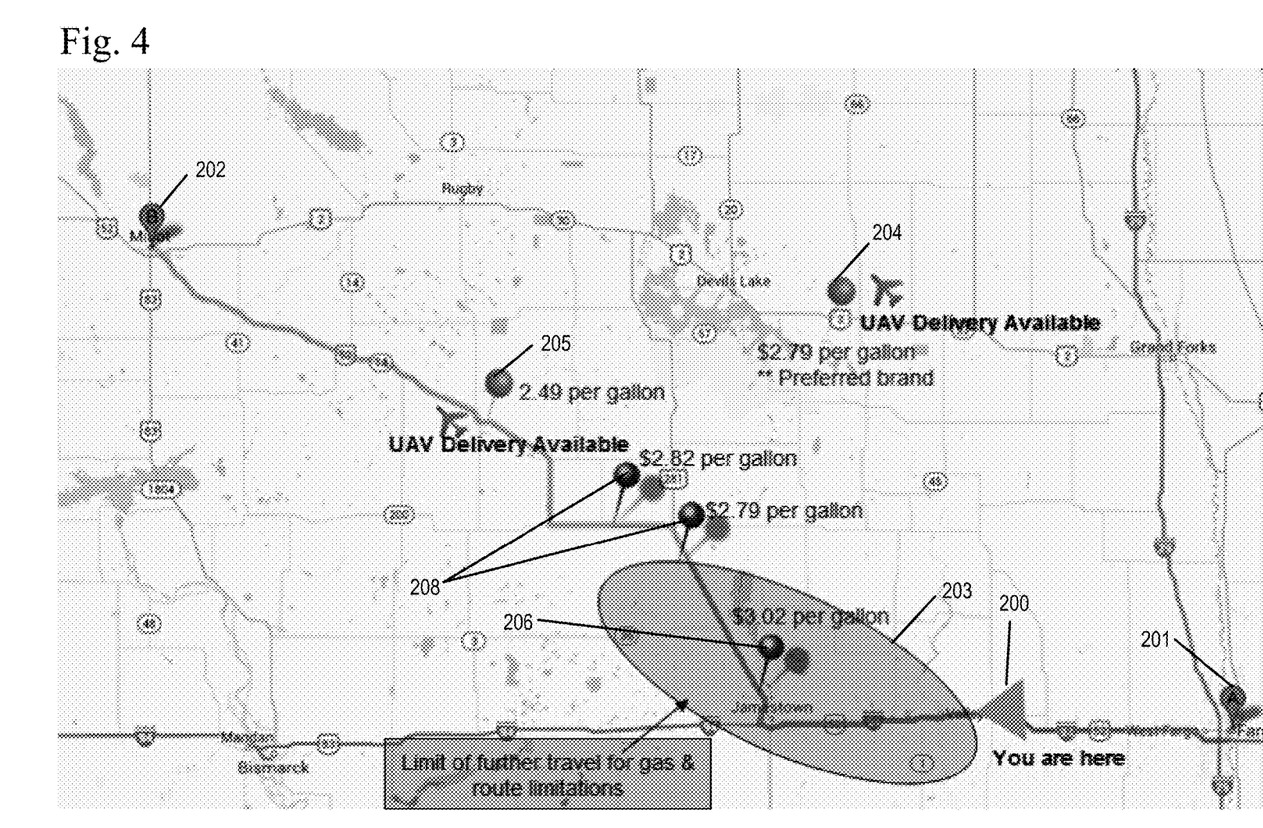
FIG. 4 shows a schematic of using an unmanned aerial vehicle (UAV) for delivering fuel to a vehicle within an optimal refueling plan.

FIG. 4 shows a schematic of using an unmanned aerial vehicle (UAV) for delivering fuel to a road vehicle within an optimal refueling plan. In this example, the user is traveling from a first point 201 to a second, destination point 202. The fuel consumption of the road vehicle 200, shown as the triangle, is monitored, for example by a fuel monitoring program through a vehicular computer. When the fuel falls below a predefined threshold, the number of miles remaining to the destination as well as the average and expected fuel mileage are determined and compared to the miles remaining. Since there will not be enough fuel left for the road vehicle 200 to reach the destination point 202 without refueling, the vehicular computer, through the fuel station program determines fuel stations within a range that show the costs associated, and preferred brand of the user. The time to reach the stations may also be presented to the user.

Within oval 203, indicating the fuel range of the road vehicle 200, is a single fuel station 206 with a cost of $3.02 per gallon. Outside of the driving range 203 are other fueling stations 208 that are of less cost per gallon than present within driving range 203, are the user's preferred brand, and provide UAV delivery. Some of the fuel stations are off the current route to the destination, for example the station 204 (which has the preferred brand of fuel and UAV delivery). Other stations 205 provide UAV delivery at less cost but are not the user's preferred brand. The user of the road vehicle 200 provides input as to what refueling they wish to proceed with so that the user can reach their destination point 202. The user may choose to refuel at the fuel station 206 within driving range 203, receive UAV delivery of at least some fuel from their preferred brand fuel station 204 which is off the route, or receive at least some fuel from a fuel station that is less cost, for example fuel station 205 to either reach the destination point 202 or drive to their preferred brand gas station 204.

FIG. 5 illustrates internal and external components of device computer 52 and server computer 54 in which illustrative embodiments may be implemented. In FIG. 5, device computer 52 and server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828, a fuel monitoring program 66, a fuel delivery program 68 and a fuel station program 67 are stored on one or more of the computer-readable tangible storage devices 830 for execution by one or more of the processors 820 via one or more of the RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Fuel monitoring program 66, fuel delivery program 68 and fuel station program 67 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Fuel monitoring program 66, fuel delivery program 68 and fuel station program 67 can be downloaded to the device computer 52 and server computer 54 from an external computer via a network (for example, the Internet, a local area network or other, wide area network) and network adapter or interface 836. From the network adapter or interface 836, fuel monitoring program 66, fuel delivery program 68 and fuel station program 67 are loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Fuel monitoring program 66, fuel delivery program 68 and fuel station program 67 can be written in various programming languages including low-level, high-level, object-oriented or non object-oriented languages. Alternatively, the functions of a fuel monitoring program 66, a fuel delivery program 68 and a fuel station program 67 can be implemented in whole or in part by computer circuits and other hardware (not shown).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having thus described the invention of the present application in detail and by reference to embodiments thereof, it will be apparent that modifications and variations are possible without departing from the scope of the invention defined in the appended claims.

What is claimed is:

1. A method of generating a refueling plan for a road vehicle on a route comprising the steps of:
   a computer monitoring fuel consumption of the road vehicle and an amount of fuel remaining within the road vehicle;
   wherein when a fuel level within the road vehicle falls below a threshold, the computer determining a number of miles remaining on the route and fuel mileage of the road vehicle;
   the computer generating a list of fuel stations which are within driving range of the road vehicle based on the fuel mileage of the road vehicle, the list also comprising fuel stations which are outside the driving range of the road vehicle which have a service for delivery of fuel to a point within the driving range of the road vehicle, the list including at least a price of the fuel and brand of the fuel at each of the fuel stations;
   the computer providing the list of fuel stations to a user of the road vehicle; and
   the computer receiving input from the user selecting a fuel station for refueling.

2. The method of claim 1, wherein the threshold is set by the user.

3. The method of claim 1, wherein the threshold is set by a manufacturer of the road vehicle.

4. The method of claim 1, wherein the service for delivery of fuel by fuel stations outside of driving range comprises delivery of fuel by an unmanned aerial vehicle.

5. The method of claim 4, wherein when the user selects a fuel station outside the driving range of the road vehicle with the service for delivery of fuel, the method further comprises the steps of:
   the computer sending a signal to the fuel station selected by the user for refueling by the unmanned aerial vehicle, providing the fuel station with at least a current location of the road vehicle; and
   the computer receiving an estimated time of arrival of the unmanned aerial vehicle.

6. The method of claim 5, further comprising the steps of:
   the computer receiving instructions providing procedures for the road vehicle for refueling by the unmanned aerial vehicle; and
   the computer displaying the instructions to the user of the road vehicle.

7. The method of claim 1, wherein the step of generating a list of fuel stations further comprises the step of computing a cost of refueling the road vehicle at each of the fuel stations on the list.

8. The method of claim 7, wherein the step of computing the cost of refueling for each fuel station which is not on the route comprises the step of the computer determining a deviation from the route to reach the fuel station.

9. The method of claim 7, wherein the step of computing the cost of refueling for each fuel station outside of the driving range of the road vehicle which have a service for delivery of fuel to a point within the driving range of the road vehicle comprises the computer determining a deviation from the route to the point for delivery of fuel, and the computer determining costs for the service of delivery of fuel to the point for delivery of fuel.

10. The method of claim 7, further comprising the step of ranking the fuel stations based on preferences of the user of the road vehicle.

11. A computer program product for generating a refueling plan for a road vehicle on a route comprising a computer comprising at least one processor, one or more memories, one or more computer readable storage media, the computer program product comprising a computer readable storage medium having program instructions embodied therewith, the program instructions executable by the computer to perform a method comprising:
   monitoring, by the computer, fuel consumption of the road vehicle and an amount of fuel remaining within the road vehicle;
   wherein when a fuel level within the road vehicle falls below a threshold, the computer determining a number of miles remaining on the route and fuel mileage of the road vehicle;
   generating, by the computer, a list of fuel stations which are within driving range of the road vehicle based on the fuel mileage of the road vehicle, the list also comprising fuel stations which are outside the driving range of the road vehicle which have a service for delivery of fuel to a point within the driving range of the road vehicle, the list including at least a price of the fuel and brand of the fuel at each of the fuel stations;
   providing, by the computer, the list of fuel stations to a user of the road vehicle; and
   receiving, by the computer, input from the user selecting a fuel station for refueling.

12. The computer program product of claim 11, wherein the service for delivery of fuel by fuel stations outside of driving range comprises delivery of fuel by an unmanned aerial vehicle.

13. The computer program product of claim 12, wherein when the user selects a fuel station outside the driving range of the road vehicle with the service for delivery of fuel, the program instructions further comprises the steps of:
   sending, by the computer, a signal to the fuel station selected by the user for refueling by the unmanned aerial vehicle, providing the fuel station with at least a current location of the road vehicle; and
   receiving, by the computer, an estimated time of arrival of the unmanned aerial vehicle.

14. The computer program product of claim 13, the program instructions further comprising the steps of:
   receiving, by the computer, instructions providing procedures for the road vehicle for refueling by the unmanned aerial vehicle; and
   displaying, by the computer, the instructions to the user of the road vehicle.

15. The computer program product of claim 11, wherein the step of generating a list of fuel stations further comprises the step of computing, by the computer, a cost of refueling the road vehicle at each of the fuel stations on the list.

16. A computer system for generating a refueling plan for a road vehicle on a route comprising a computer comprising at least one processor, one or more memories, one or more computer readable storage media having program instructions executable by the computer to perform the program instructions comprising:
   monitoring, by the computer, fuel consumption of the road vehicle and an amount of fuel remaining within the road vehicle;
   wherein when a fuel level within the road vehicle falls below a threshold, the computer determining a number of miles remaining on the route and fuel mileage of the road vehicle;
   generating, by the computer, a list of fuel stations which are within driving range of the road vehicle based on the fuel mileage of the road vehicle, the list also comprising fuel stations which are outside the driving range of the road vehicle which have a service for delivery of fuel to a point within the driving range of the road vehicle, the list including at least a price of the fuel and brand of the fuel at each of the fuel stations;

providing, by the computer, the list of fuel stations to a user of the road vehicle; and receiving, by the computer, input from the user selecting a fuel station for refueling.

17. The computer system of claim 16, wherein the service for delivery of fuel by fuel stations outside of driving range comprises delivery of fuel by an unmanned aerial vehicle.

18. The computer system of claim 17, wherein when the user selects a fuel station outside the driving range of the road vehicle with the service for delivery of fuel, the program instructions further comprising:

sending, by the computer, a signal to the fuel station selected by the user for refueling by the unmanned aerial vehicle, providing the fuel station with at least a current location of the road vehicle; and receiving, by the computer, an estimated time of arrival of the unmanned aerial vehicle.

19. The computer system of claim 18, the program instructions further comprising:

receiving, by the computer, instructions providing procedures for the road vehicle for refueling by the unmanned aerial vehicle; and displaying, by the computer, the instructions to the user of the road vehicle.

20. The computer system of claim 16, wherein the program instructions of generating a list of fuel stations further comprises computing, by the computer, a cost of refueling the road vehicle at each of the fuel stations on the list.

* * * * *